(12) United States Patent
Bhat et al.

(10) Patent No.: US 11,178,205 B2
(45) Date of Patent: Nov. 16, 2021

(54) SYSTEM AND METHOD FOR PROVIDING LIVE STREAMING OF VIDEO DATA IN A LOW-BANDWIDTH NETWORK

(71) Applicant: Ideaforge Technology Pvt. Ltd., Navi Mumbai (IN)

(72) Inventors: Ashish Bhat, Navi Mumbai (IN); Dhirendra Sarup, Navi Mumbai (IN); Vinayak Warikoo, Navi Mumbai (IN); Akshay Walvekar, Navi Mumbai (IN); Krishan Kumar, Navi Mumbai (IN)

(73) Assignee: Ideaforge Technology Pvt. Ltd., Navi Mumbai (IN)

( * ) Notice: Subject to any disclaimer, the term of this patent is extended or adjusted under 35 U.S.C. 154(b) by 0 days.

(21) Appl. No.: 17/152,884

(22) Filed: Jan. 20, 2021

(65) Prior Publication Data

US 2021/0227013 A1 Jul. 22, 2021

(30) Foreign Application Priority Data

Jan. 20, 2020 (IN) .............................. 202021002430

(51) Int. Cl.
*H04L 29/06* (2006.01)
*H04N 21/2343* (2011.01)
*H04N 21/845* (2011.01)

(52) U.S. Cl.
CPC ........ *H04L 65/607* (2013.01); *H04L 65/4084* (2013.01); *H04L 65/80* (2013.01); *H04N 21/23439* (2013.01); *H04N 21/8456* (2013.01)

(58) Field of Classification Search
CPC .......... H04N 21/8456; H04N 21/23439; H04L 65/80; H04L 65/607; H04L 65/4084;
(Continued)

(56) References Cited

U.S. PATENT DOCUMENTS 8,411,755 B2 4/2013 Ohnishi et al.
2007/0296854 A1* 12/2007 Berkey ............ H04N 21/23406
348/412.1

(Continued)

FOREIGN PATENT DOCUMENTS

JP 2004056819 A 2/2004
JP 2005086362 A 3/2005

OTHER PUBLICATIONS

L. Huo, Q. Fu, Y. Zou and W. Gao, "Network Adapted Selective Frame-Dropping Algorithm for Streaming Media," in IEEE Transactions on Consumer Electronics, vol. 53, No. 2, pp. 417-423, May 2007, doi: 10.1109/TCE.2007.381710. (Year: 2007).*

*Primary Examiner* — Caroline H Jahnige
(74) *Attorney, Agent, or Firm* — Katherine Koenig; Koenig IP Works, PLLC (57) ABSTRACT

The present disclosure provides a system and method for providing live streaming of video data. The system includes: a storage unit to store a plurality of waiting to transmit a set of multimedia data signals from one I-frame to next I-frame; an index assignment unit to assign an index number to each multimedia data signal to be transmitted; a latency calculating unit to calculate latency count in transmission upon transmission of the set of multimedia data signals such that a predefined condition is checked, by a conditioning unit; a transmitting unit adapted to transmit the set of multimedia data signals, I-frames, inter-coded frames (P-frames) based on calculated latency count; and an elimination unit configured to, when the latency count is equal to the predefined condition, eliminate at least same number of un-transmitted P-frames prior to an immediate next I-frame waiting to be transmitted in the storage unit.

12 Claims, 6 Drawing Sheets

(58) Field of Classification Search
CPC ... H04L 65/4076; H04L 67/02; H04L 65/608; H04L 65/604; H04L 65/602
See application file for complete search history.

(56) References Cited

U.S. PATENT DOCUMENTS

| | | | |
|---|---|---|---|
| 2010/0054343 A1* | 3/2010 | Ohnishi | H04N 5/38 |
| | | | 375/240.26 |
| 2012/0106328 A1* | 5/2012 | Gan | H04N 21/26216 |
| | | | 370/230 |
| 2013/0329809 A1* | 12/2013 | Leontaris | H04N 19/89 |
| | | | 375/240.25 |

* cited by examiner

SYSTEM AND METHOD FOR PROVIDING LIVE STREAMING OF VIDEO DATA IN A LOW-BANDWIDTH NETWORK

CROSS-REFERENCE TO RELATED APPLICATIONS

This Application is related to and claims priority to Indian Application No. 202021002430, filed Jan. 20, 2020, entitled SYSTEM AND METHOD FOR PROVIDING LIVE STREAMING OF VIDEO DATA IN A LOW-BANDWIDTH NETWORK, the entirety of which is incorporated herein by reference.

GOVERNMENT RIGHTS STATEMENT

N/A.

TECHNICAL FIELD

The present disclosure relates to the field of data communication systems for streaming media objects. More particularly, the present disclosure relates to a system and method to provide live video streaming with low latency.

BACKGROUND

Background description includes information that can be useful in understanding the present invention. It is not an admission that any of the information provided herein is prior art or relevant to the presently claimed invention, or that any publication specifically or implicitly referenced is prior art.

Traditionally, video streaming is an important field of global communications and data processing. It is divided into server and client sides connected via network. Video streaming is concerned with delivering video data from server to client over the network as fast and with as little loss as possible. Further, streaming video is a form of multimedia that is presented to a user while being delivered by a provider, as distinguished from simple file transfer, which involves receiving the entire video content before playing it back. Hypertext Transfer Protocol (HTTP) has been adopted as a scalable and efficient protocol for streaming video content via the Internet. HTTP Live Streaming (HLS), HTTP Dynamic Streaming (HDS), and Dynamic Adaptive Streaming over HTTP (DASH) are examples of existing techniques for streaming multimedia from HTTP web servers.

The video content is divided into a series of file segments. Using these protocols, each segment is delivered individually. For instance, with existing HTTP streaming techniques, the segments have fixed intervals, and each segment is regarded as a separate resource for HTTP requests and responses. As a result, the video content cannot be delivered and played back until the entire fixed-interval video segment it belongs to is fully generated. Latency in live video streaming (e.g., from a live sporting event) is generally the time difference between when the live event happens and when it is played back to the user. Therefore, the latency is at least the duration of one video segment interval and the time it takes for signal to reach from one place to another is subject to additional buffering and network delays. Often, each segment is at least several seconds long, which can result in a latency of several tens of seconds. Such delays are undesirable, particularly in time-critical live streaming scenarios.

Video streaming may require a lot of bandwidth; furthermore, any delays or inconsistencies during data transfer may result in reduced video quality. These limitations are even more pronounced when videos are streamed over wireless networks. This is because wireless networks are usually slower, and interference from household devices (i.e. microwave ovens, cordless phones), radio transmitters and other network nodes may affect the quality of network service. This makes it difficult to sustain a steady flow of information and deliver packets by a deadline. To cope with these issues, the network bandwidth of the video streaming service must be managed efficiently, and to achieve that, compressed video frames are generally transmitted at the transmitter. Compressed video frames are of two types. One is key-frames (I-frames) and another one is intermediate frames (P-frames).

Key-frames represent a significant change in a scene being captured and key-frames are generated regularly every few seconds. Each key-frame can include compressed data for the frame being captured. These frames can be used independently while others dependent on preceding frames, and hence are called intra-coded frames or I-frames.

Multiple intermediate frames follow a key-frame, and each intermediate frame can include data representing motion relative to the corresponding key-frame. The size of an intermediate frame is always lesser (typically ⅛th) than a key-frame. These are dependent frames, which depend on the preceding I-frame, and they are called as predictive-coded frames or P-frames.

At a receiver end, a decoder can be used for decompressing received frames and generating raw color images. The decoder is able to decode the received key-frames independently of intermediate frames. However, for decoding intermediate frames, a corresponding key-frame must correctly be decoded first. Hence, intermediate frames are of no use if the corresponding key-frame is not received.

During transmission of compressed video frames over a wired or wireless network, latency (time delay), usually, is introduced in transmission due to network traffic or interference. Hence, at transmitter end, compressed video frames are received from a file or network stream (via protocols such as RTSP) while maintaining a constant frame rate of reception, and the frames received are buffered. The received buffered frames are simultaneously transmitted over the network, during which latency, generally, is introduced in the transmission due to network traffic or interference. Finally, if the gap between the received and transmitted frames becomes large enough to cause problems related to memory allocation or buffer overrun at the transmitter end, all un-transmitted buffered frames are skipped, and transmission is resumed from the latest received frame. However, this approach may have drawbacks. The drawbacks are: frame reception latency keeps on increasing at the receiver end, which is not desirable in cases where real time video display is required; a large amount of memory must be allocated at the transmitter end to maintain the buffer for receiving frames before transmitting them; and when transmission of lagging frames is skipped at transmitter end, decoder at receiver end is unable to decode all intermediate frames received after that till a new key-frame is received, which garbles (distorts) the video display.

Efforts have been made in the related art to provide live video streaming. Japanese Patent document JP2005086362 discloses a technique in which in a case where video transmission is delayed or interrupted due to network trouble or the like, a past video frame group that is not able to be transmitted is eliminated and the latest video frame group is transmitted so that delay can be reduced. However, this solution may not be reliable and efficient, and latency corresponding to the elimination is not accurate. There might be chances of data loss during video streaming and this may affect performance, throughput and quality of live streaming.

Japanese Patent document JP2004056819 discloses a first encoding unit configured to generate inter-frame predictive coded first video data, and a second encoding unit configured to generate intra-frame predictive coded second video data. At resumption of transmission, the second video data is transmitted as a complement to the first video data, and the second video data is decoded in advance. Consequently, even if transmission is resumed from a middle portion of a group of pictures (GOP), video data can be correctly decoded and played back. However, this solution may have many processing steps involved and this may lead to inefficient and unreliable video streaming with degraded quality due to simply skipping to the latest fragment to resume transmission, whether it is I-frame or P-frame, as if the received data unit is a P-frame, where an error occurs in a general playback method as decoding cannot be adequately performed.

U.S. Pat. No. 8,411,755 provides a solution to overcome the stated problem by eliminating all the frames in-between the video transmission delay time or interruption time and transmitting a fragment that starts with a I-frame after the interruption time. However, in this method, since it also eliminates any fragment during the video delay or interruption time, the reduction in latency is achieved by deleting a number of fragments starting with key video frames while reconstructing videos.

Therefore, there is a need in the art for a system and method to provide live video streaming with reduced latency and enhanced quality, and without deleting any frames.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities or dimensions of items, and so forth, used to describe and claim certain embodiments of the invention are to be understood as being modified in some instances by the term "about." Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

OBJECTS OF THE INVENTION

It is an object of the present invention to provide a system for live streaming video data with reduced latency and interference.

It is another object of the present invention to provide a reliable, optimized and efficient system and method for live streaming of high definition video data with reduced latency on irregular networks.

It is another object of the present invention to provide a method for live streaming video data with reduced latency and interference.

It is another object of the present invention to provide a reliable, optimized and efficient system and method for live streaming video data, with reduced latency, on low-bandwidth networks.

It is another object of the present invention to provide a robust system and method for live streaming video data with reduced latency and with enhanced quality.

It is another object of the present invention to provide a system and method for live streaming video data by utilizing less memory and without garbling the video data.

It is another object of the present invention to provide a system and method for live streaming video data with less transmission retries and higher throughput.

It is another object of the present disclosure to provide a system and method for providing high resolution live streaming video data with reduced latency.

SUMMARY

The present disclosure relates to the field of data communication systems for streaming media objects. More particularly, the present disclosure relates to a system and method to provide live video streaming with low latency.

This summary is provided to introduce simplified concepts of a system for time bound availability check of an entity, which are further described below in the detailed description. This summary is not intended to identify key or essential features of the claimed subject matter, nor is it intended for use in determining/limiting the scope of the claimed subject matter.

An aspect of the present disclosure pertains to a system for providing live streaming of video data in a low-bandwidth network. The system includes: a storage unit configured to store a plurality of waiting to transmit a set of multimedia data signals from one intra-coded frame (I-frame) to next I-frame; an index assignment unit operatively coupled to the storage unit and adapted to assign an index number to each multimedia data signal to be transmitted; a latency calculating unit operatively coupled to the index assignment unit and configured to calculate latency count in transmission upon transmission of the set of multimedia data signals such that a predefined condition is checked, by a conditioning unit; a transmitting unit operatively coupled to the conditioning unit and adapted to transmit the set of multimedia data signals, I-frames, inter-coded frames (P-frames) based on calculated latency count; and an elimination unit operatively coupled to the transmitting unit, the elimination unit is configured to, when the latency count is equal to the predefined condition, eliminate at least same number of un-transmitted P-frames prior to an immediate next I-frame waiting to be transmitted in the storage unit.

In an embodiment, the system comprises a receiving unit configured to decode a received I-frame from the transmitting unit.

In another embodiment, the system includes a control unit operatively coupled to the elimination unit. The control unit includes one or more processors and a memory coupled to the processors, the memory storing instructions executable by the one or more processors to control the transmitting unit in transmitting the immediate next I-frame after elimination of the P-frames.

In another embodiment, the latency calculating unit can be configured to calculate latency count by computing difference between a transmitted frame and received frames, wherein each transmitted frame includes an index number and upon receipt of the transmitted frame by a receiver, the receiver is adapted to generate an acknowledgement frame with the corresponding index number to the transmitting unit, and wherein the latency calculation unit, upon generation of an acknowledgement frame, calculates the latency count.

In another embodiment, when the calculated latency count is not equal to a corresponding index number of an un-transmitted P-frame, then a corresponding frame in a queue is de-queued and sent to the receiver.

In another embodiment, when the calculated latency count is not less than a corresponding index number of an un-transmitted P-frame, then a remaining number of un-transmitted P-frames that are not less than the latency count, prior to an immediate next I-frame is eliminated from frames kept in the queue, and transmission is resumed from the immediate next I-frame.

Another aspect of the present disclosure pertains to a method for providing live streaming of video data in a low-bandwidth network. The method includes steps of: storing, by a storage unit, a plurality of waiting to transmit a set of multimedia data signals from one intra-coded frame (I-frame) to next I-frame; assigning, by an index assignment unit, an index number to each multimedia data signal to be transmitted; calculating, by a latency calculating unit, latency count in transmission upon transmission of the set of multimedia data signals such that a predefined condition is checked, by a conditioning unit; transmitting, by a transmitting unit, the set of multimedia data signals, I-frames, inter-coded frames (P-frames) based on calculated latency count; and eliminating, by an elimination unit, at least same number of un-transmitted P-frames prior to an immediate next I-frame waiting to be transmitted in the storage unit, when the latency count is equal to the predefined condition.

In an embodiment, the method includes a step of controlling, by a control unit, the transmitting unit in transmitting the immediate next I-frame after elimination of the P-frames.

In another embodiment, the method includes a step of decoding, using the TV broadcasting station, the set of audio signals for use by a service provider.

In another embodiment, at the step of calculating latency, the latency calculating unit can be configured to calculate latency count by computing difference between a transmitted frame and received frames, wherein each transmitted frame includes an index number and upon receipt of the transmitted frame by a receiver, the receiver is adapted to generate an acknowledgement frame with the corresponding index number to the transmitting unit, wherein the latency calculation unit, upon generation of an acknowledgement frame, calculates the latency count.

In another embodiment, in the method, when the calculated latency count is not equal to a corresponding index number of an un-transmitted P-frame, then a corresponding frame in a queue is de-queued and sent to the receiver.

In another embodiment, when the calculated latency count is not less than a corresponding index number of an un-transmitted P-frame, then a remaining number of un-transmitted P-frames that are not less than the latency count, prior to an immediate next I-frame is eliminated from frames kept in the queue, and transmission is resumed from the immediate next I-frame.

An aspect of the present disclosure pertains to a UAV-based system for providing live streaming of video data in a low-bandwidth network. The system includes: a storage unit provided on the UAV, configured to store a plurality of waiting to transmit a set of multimedia data signals from one intra-coded frame (I-frame) to next I-frame; an index assignment unit operatively coupled to the storage unit and adapted to assign an index number to each multimedia data signal to be transmitted; a latency calculating unit operatively coupled to the index assignment unit and configured to calculate latency count in transmission upon transmission of the set of multimedia data signals such that a predefined condition is checked, by a conditioning unit; a transmitting unit provided on the UAV, operatively coupled to the conditioning unit and adapted to transmit the set of multimedia data signals, I-frames, inter-coded frames (P-frames) based on calculated latency count; and an elimination unit operatively coupled to the transmitting unit, the elimination unit is configured to, when the latency count is equal to the predefined condition, eliminate at least same number of un-transmitted P-frames prior to an immediate next I-frame waiting to be transmitted in the storage unit.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

The diagrams are for illustration only, which thus is not a limitation of the present disclosure, and wherein.

DETAILED DESCRIPTION

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, and firmware and/or by human operators.

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Exemplary embodiments will now be described more fully hereinafter with reference to the accompanying drawings, in which exemplary embodiments are shown. These exemplary embodiments are provided only for illustrative purposes and so that this disclosure will be thorough and complete and will fully convey the scope of the invention to those of ordinary skill in the art. The invention disclosed may, however, be embodied in many different forms and should not be construed as limited to the embodiments set forth herein. Various modifications will be readily apparent to persons skilled in the art. The general principles defined herein may be applied to other embodiments and applications without departing from the spirit and scope of the invention. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named element.

Embodiments of the present invention may be provided as a computer program product, which may include a machine-readable storage medium tangibly embodying thereon instructions, which may be used to program a computer (or other electronic devices) to perform a process. The term "machine-readable storage medium" or "computer-readable storage medium" includes, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). A machine-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases, it will be recognized that references to the "invention" will refer to subject matter recited in one or more, but not necessarily all, of the claims.

All methods described herein may be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Various terms as used herein are shown below. To the extent a term used in a claim is not defined below, it should be given the broadest definition persons in the pertinent art have given that term as reflected in printed publications and issued patents at the time of filing.

The present disclosure relates to the field of data communication systems for streaming media objects. More particularly, the present disclosure relates to a system and method to provide live video streaming with low latency.

An aspect of the present disclosure pertains to a system for providing live streaming of video data in a low-bandwidth network. The system includes: a storage unit configured to store a plurality of waiting to transmit a set of multimedia data signals from one intra-coded frame (I-frame) to next I-frame; an index assignment unit operatively coupled to the storage unit and adapted to assign an index number to each multimedia data signal to be transmitted; a latency calculating unit operatively coupled to the index assignment unit and configured to calculate latency count in transmission upon transmission of the set of multimedia data signals such that a predefined condition is checked, by a conditioning unit; a transmitting unit operatively coupled to the conditioning unit and adapted to transmit the set of multimedia data signals, I-frames, inter-coded frames (P-frames) based on calculated latency count; and an elimination unit operatively coupled to the transmitting unit, the elimination unit is configured to, when the latency count is equal to the predefined condition, eliminate at least same number of un-transmitted P-frames prior to an immediate next I-frame waiting to be transmitted in the storage unit.

In an embodiment, the system comprises a receiving unit configured to decode a received I-frame from the transmitting unit.

In another embodiment, the system includes a control unit operatively coupled to the elimination unit. The control unit includes one or more processors and a memory coupled to the processors, the memory storing instructions executable by the one or more processors to control the transmitting unit in transmitting the immediate next I-frame after elimination of the P-frames.

In another embodiment, the latency calculating unit can be configured to calculate latency count by computing difference between a transmitted frame and received frames, wherein each transmitted frame includes an index number and upon receipt of the transmitted frame by a receiver, the receiver is adapted to generate an acknowledgement frame with the corresponding index number to the transmitting unit, and wherein the latency calculation unit, upon generation of an acknowledgement frame, calculates the latency count.

In another embodiment, when the calculated latency count is not equal to a corresponding index number of an un-transmitted P-frame, then a corresponding frame in a queue is de-queued and sent to the receiver.

In another embodiment, when the calculated latency count is not less than a corresponding index number of an un-transmitted P-frame, then a remaining number of un-transmitted P-frames that are not less than the latency count, prior to an immediate next I-frame is eliminated from frames kept in the queue, and transmission is resumed from the immediate next I-frame.

Another aspect of the present disclosure pertains to a method for providing live streaming of video data in a low-bandwidth network. The method includes steps of: storing, by a storage unit, a plurality of waiting to transmit a set of multimedia data signals from one intra-coded frame (I-frame) to next I-frame; assigning, by an index assignment unit, an index number to each multimedia data signal to be transmitted; calculating, by a latency calculating unit, latency count in transmission upon transmission of the set of multimedia data signals such that a predefined condition is checked, by a conditioning unit; transmitting, by a transmitting unit, the set of multimedia data signals, I-frames, inter-coded frames (P-frames) based on calculated latency count; and eliminating, by an elimination unit, at least same number of un-transmitted P-frames prior to an immediate next I-frame waiting to be transmitted in the storage unit, when the latency count is equal to the predefined condition.

In an embodiment, the method includes a step of controlling, by a control unit, the transmitting unit in transmitting the immediate next I-frame after elimination of the P-frames.

In another embodiment, the method includes a step of decoding, using the TV broadcasting station, the set of audio signals for use by a service provider.

In another embodiment, at the step of calculating latency, the latency calculating unit can be configured to calculate latency count by computing difference between a transmitted frame and received frames, wherein each transmitted frame includes an index number and upon receipt of the transmitted frame by a receiver, the receiver is adapted to generate an acknowledgement frame with the corresponding index number to the transmitting unit, wherein the latency calculation unit, upon generation of an acknowledgement frame, calculates the latency count.

In another embodiment, in the method, when the calculated latency count is not equal to a corresponding index number of an un-transmitted P-frame, then a corresponding frame in a queue is de-queued and sent to the receiver.

In another embodiment, when the calculated latency count is not less than a corresponding index number of an un-transmitted P-frame, then a remaining number of un-transmitted P-frames that are not less than the latency count, prior to an immediate next I-frame is eliminated from frames kept in the queue, and transmission is resumed from the immediate next I-frame.

An aspect of the present disclosure pertains to a UAV-based system for providing live streaming of video data in a low-bandwidth network. The system includes: a storage unit provided on the UAV, configured to store a plurality of waiting to transmit a set of multimedia data signals from one intra-coded frame (I-frame) to next I-frame; an index assignment unit operatively coupled to the storage unit and adapted to assign an index number to each multimedia data signal to be transmitted; a latency calculating unit operatively coupled to the index assignment unit and configured to calculate latency count in transmission upon transmission of the set of multimedia data signals such that a predefined condition is checked, by a conditioning unit; a transmitting unit provided on the UAV, operatively coupled to the conditioning unit and adapted to transmit the set of multimedia data signals, I-frames, inter-coded frames (P-frames) based on calculated latency count; and an elimination unit operatively coupled to the transmitting unit, the elimination unit is configured to, when the latency count is equal to the predefined condition, eliminate at least same number of un-transmitted P-frames prior to an immediate next I-frame waiting to be transmitted in the storage unit.

Figure 1:
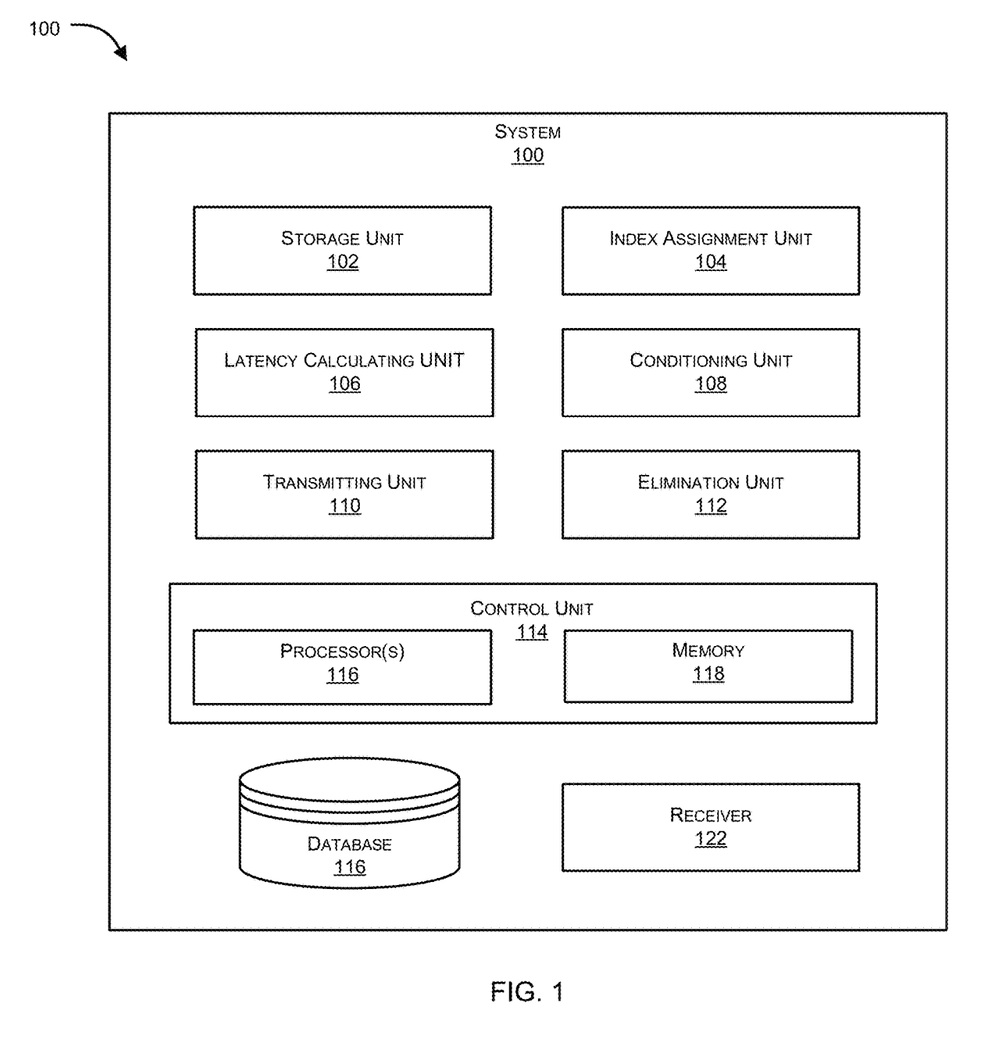
FIG. 1 illustrates an exemplary block diagram of a system for providing live streaming of video data, in accordance with an embodiment of the present disclosure.

FIG. 1 illustrates an exemplary block diagram of a system for providing live streaming of video data, in accordance with an embodiment of the present disclosure.

According to an embodiment, the system 100 can include one or more processor(s) 116. The one or more processor(s) 116 can be implemented as one or more microprocessors, microcomputers, microcontrollers, digital signal processors, central processing units, logic circuitries, and/or any devices that manipulate data based on operational instructions. Among other capabilities, the one or more processor(s) 116 are configured to fetch and execute computer-readable instructions stored in a memory 118 of the system 100. The memory 118 can store one or more computer-readable instructions or routines, which can be fetched and executed to create or share the data units over a network service. The memory 118 can include any non-transitory storage device including, for example, volatile memory such as RAM, or non-volatile memory such as EPROM, flash memory, and the like.

Various components/units of the proposed system 100 can be implemented as a combination of hardware and programming (for example, programmable instructions) to implement their one or more functionalities as elaborated further themselves or using processors 116. In examples described herein, such combinations of hardware and programming can be implemented in several different ways. For example, the programming for the units can be processor executable instructions stored on a non-transitory machine-readable storage medium and the hardware for units can include a processing resource (for example, one or more processors), to execute such instructions. In the present examples, the machine-readable storage medium can store instructions that, when executed by the processing resource, implements the various units. In such examples, the system 100 can include the machine-readable storage medium storing the instructions and the processing resource to execute the instructions, or the machine-readable storage medium can be separate but accessible to the system 100 and the processing resource. In other examples, the units can be implemented by electronic circuitry. A database 120 can include data that is either stored or generated as a result of functionalities implemented by any of the other components/units of the proposed system 100.

In an embodiment, the system 100 system for providing live streaming of video data in a low-bandwidth network is disclosed. The system 100 includes: a storage unit 102, an index assignment unit 104, a latency calculating unit 106, a conditioning unit 108, a transmitting unit 110, an elimination unit 112, a control unit 114, database 120 and a receiver 122.

In an embodiment, the storage unit 102 can be configured to store a plurality of waiting to transmit a set of multimedia data signals from one intra-coded frame (I-frame) to next I-frame. The index assignment unit 104 can be operatively coupled to the storage unit 102 and can be adapted to assign an index number to each multimedia data signal to be transmitted.

In an embodiment, the latency calculating unit 106 can be operatively coupled to the index assignment unit 104 and can be configured to calculate latency count in transmission upon transmission of the set of multimedia data signals such that the conditioning unit 108 checks a predefined condition. The transmitting unit 110 can be operatively coupled to the conditioning unit 108 and can be adapted to transmit the set of multimedia data signals, I-frames, inter-coded frames (P-frames) based on calculated latency count.

In an embodiment, the elimination unit 112 can be operatively coupled to the transmitting unit 110, the elimination unit 112 is configured to, when the latency count is equal to the predefined condition, eliminate at least same number of un-transmitted P-frames prior to an immediate next I-frame waiting to be transmitted in the storage unit 102.

In an embodiment, the control unit 114 can be operatively coupled to the elimination unit 112. The control unit 114 includes processors 116 and memory 118 coupled to the processors 116, the memory 118 is storing instructions executable by the processors 116 to control the transmitting unit 110 in transmitting the immediate next I-frame after elimination of the P-frames.

In an embodiment, the latency calculating unit 106 is configured to calculate latency count by computing difference between a transmitted frame and received frames, wherein each transmitted frame includes an index number and upon receipt of the transmitted frame by a receiver 122, the receiver 122 is adapted to generate an acknowledgement frame with the corresponding index number to the transmitting unit 110, and wherein the latency calculation unit 106, upon generation of an acknowledgement frame, calculates the latency count.

In an embodiment, when the calculated latency count is not equal to a corresponding index number of an un-transmitted P-frame, then a corresponding frame in a queue is de-queued and sent to the receiver 122.

In an embodiment, when the calculated latency count is not less than a corresponding index number of an un-transmitted P-frame, then a remaining number of un-transmitted P-frames that are not less than the latency count, prior to an immediate next I-frame is eliminated from frames kept in the queue, and transmission is resumed from the immediate next I-frame.

In an exemplary embodiment, if the computed latency count (index difference) is greater than or equal to Frame Gap-Frame Index (the index number of the current un-transmitted p-frame), then the remaining number of un-transmitted P-frames that are equal or greater than the latency count prior to the immediate next I-frame is kept being stored in the queue without sending it to the receiver 122 as soon as each immediate P-frame is received before the immediate next I-frame. During reception of the P-frames, the latency calculating unit 106 keeps computing/calculating the latency count, and if it finds that the latency count has reduced than the previous latency count, then it retrieves the P-frames next in-line to the last transmitted frame sequentially that is stored in the queue and transmits it. The number of P-frames to be retrieved and sent depends on the reduction in the latency frame count.

In an exemplary embodiment, if the latency counts are reduced by 1, then the transmitting unit 110 retrieves the first next in-line stored P-frame from the queue and transmits it to the receiver 122. Again, latency count is checked, and f the latency count is reduced by 1 or more, the transmitting unit 110 retrieves the first next in-line stored P-frame from the queue and transmits it to the receiver 122. This process is repeated.

In an exemplary embodiment, if there is no change in the latency count until reception of the immediate next I-frame, then the remaining number of un-transmitted P-frames that are equal to or greater than the latency count prior to the immediate next I-frame is eliminated from the frames kept in the queue (Decrease Frame index), and transmission is resumed from the immediate next I-frame.

In an embodiment, in the network with various communication channels for live streaming video data, several parallel connections are developed instead of a single connection in order to increase throughput and reduce and control network characteristic latency.

In high bandwidth networks with higher latency, a single TCP connection will not be able to utilize the end-to-end bandwidth of the network (lower bandwidth-delay network). This can be overcome by making multiple parallel TCP connections, which can have their own send/receive buffers.

For each single frame on the transmitter side, frame data can be split according to the number of active connections before sending, and on the receiver end, the data can be received and combined from the multiple connections to regenerate the frame. Smaller packets sent on connections ensure higher probability of successful communication resulting in lesser transmission retries and higher throughput. The network health of each connection is maintained individually and if the health drops below a certain level, the connection is dropped, and a new connection request is made after a period.

It would be appreciated that although the proposed system 100 has been elaborated as above to include all the main units, it is conceivable that actual implementations are well within the scope of the present disclosure, which can include without any limitation, only a part of the proposed units or a combination of those or a division of those into sub-units in various combinations across multiple devices that can be operatively coupled with each other, including in the cloud. Further, the units can be configured in any sequence to achieve objectives elaborated. Also, it can be appreciated that proposed system 100 can be configured in a computing device or across a plurality of computing devices operatively connected with each other, wherein the computing devices can be any of a computer, a laptop, a smart phone, an Internet enabled mobile device and the like. Therefore, all possible modifications, implementations and embodiments of where and how the proposed system 100 is configured are well within the scope of the present invention.

Figure 2:
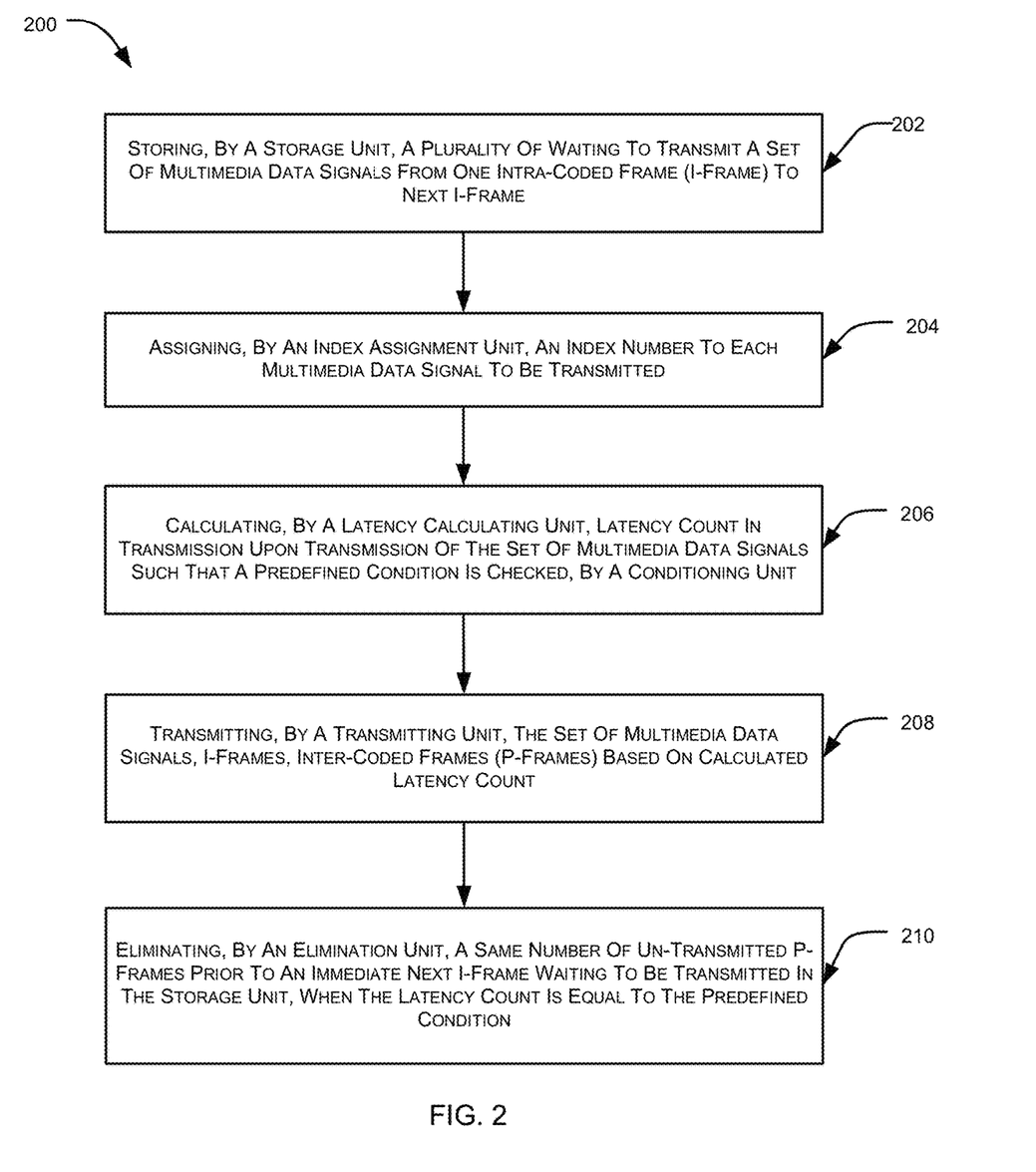
FIG. 2 illustrates an exemplary flow diagram of a method for providing live streaming of video data, in accordance with an embodiment of the present disclosure.

FIG. 2 illustrates an exemplary flow diagram of a method for providing live streaming of video data in a low-bandwidth network, in accordance with an embodiment of the present disclosure.

According to an embodiment, the method 200 can include at a step 202, storing, by a storage unit, a plurality of waiting to transmit a set of multimedia data signals from one intra-coded frame (I-frame) to next I-frame.

In an embodiment, the method 200 includes at a step 204, assigning, by an index assignment unit, an index number to each multimedia data signal to be transmitted.

In an embodiment, the method 200 includes at a step 206, calculating, by a latency calculating unit, latency count in transmission upon transmission of the set of multimedia data signals such that a predefined condition is checked, by a conditioning unit.

In an embodiment, the method 200 can include at a step 208, transmitting, by a transmitting unit, the set of multimedia data signals, I-frames, inter-coded frames (P-frames) based on calculated latency count.

In an embodiment, the method 200 can include at a step 210, eliminating, by an elimination unit, at least same number of un-transmitted P-frames prior to an immediate next I-frame waiting to be transmitted in the storage unit, when the latency count is equal to the predefined condition.

In an embodiment, the method 200 includes a step of controlling, by a control unit, the transmitting unit in transmitting the immediate next I-frame after elimination of the P-frames.

In an embodiment, at the step 206 of calculating latency, the latency calculating unit is configured to calculate latency count by computing difference between a transmitted frame and received frames, wherein each transmitted frame comprises an index number and upon receipt of the transmitted frame by a receiver, the receiver is adapted to generate an acknowledgement frame with the corresponding index number to the transmitting unit, wherein the latency calculation unit, upon generation of an acknowledgement frame, calculates the latency count. When the calculated latency count is not equal to a corresponding index number of an un-transmitted P-frame, then a corresponding frame in a queue is de-queued and sent to the receiver.

In an embodiment, when the calculated latency count is not less than a corresponding index number of an un-transmitted P-frame, then a remaining number of un-transmitted P-frames that are not less than the latency count, prior to an immediate next I-frame is eliminated from frames kept in the queue, and transmission is resumed from the immediate next I-frame.

Figure 3:
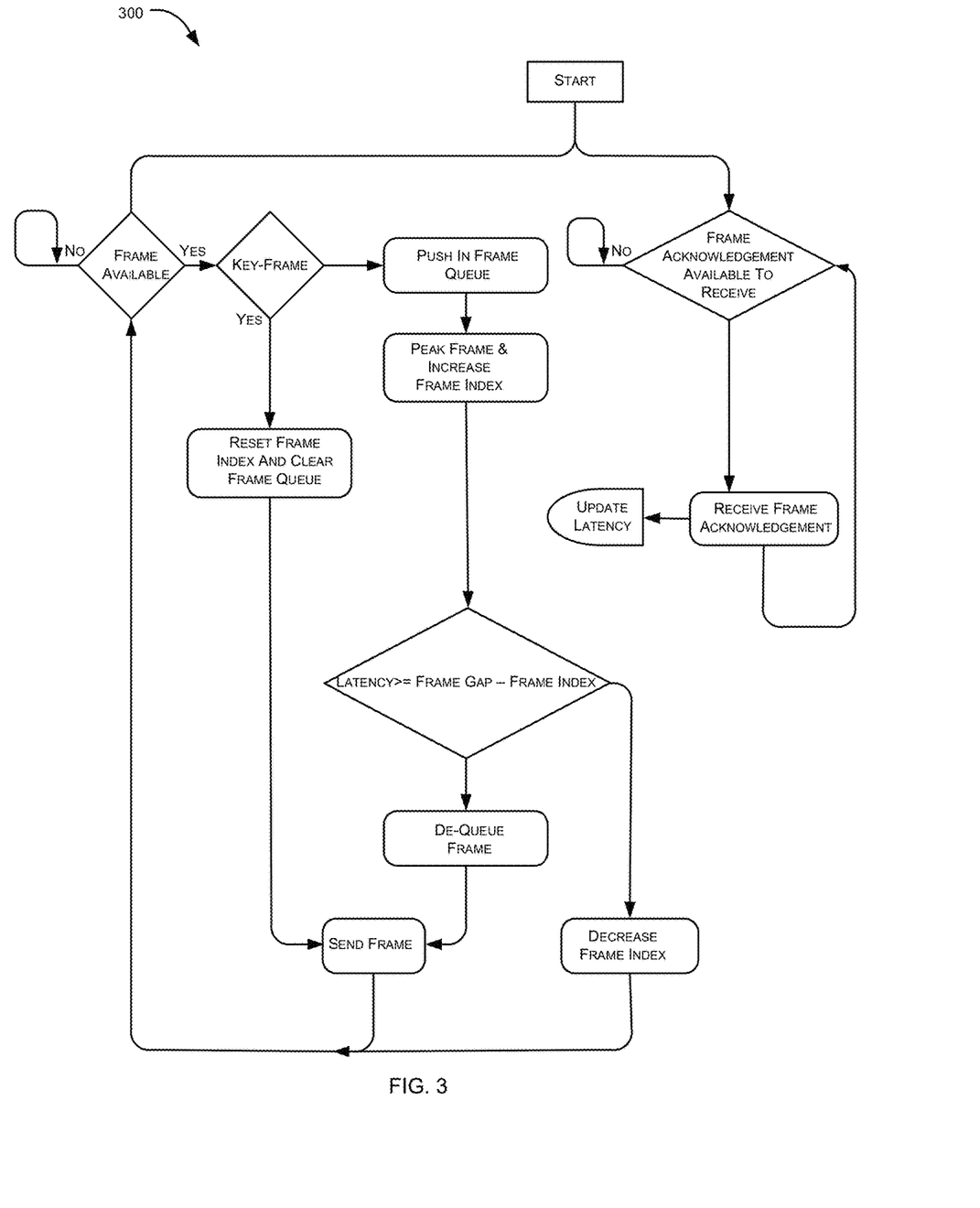
FIG. 3 illustrates an exemplary flow diagram at transmitter side of the proposed system, in accordance with an exemplary embodiment of the present disclosure.

FIG. 3 illustrates an exemplary flow diagram at transmitter side of the proposed system, in accordance with an exemplary embodiment of the present disclosure. Frame Gap can be defined as fixed number of frames generated between two consecutive key-frames. Frame Index can be current un-transmitted p-frames index number.

Figure 4:
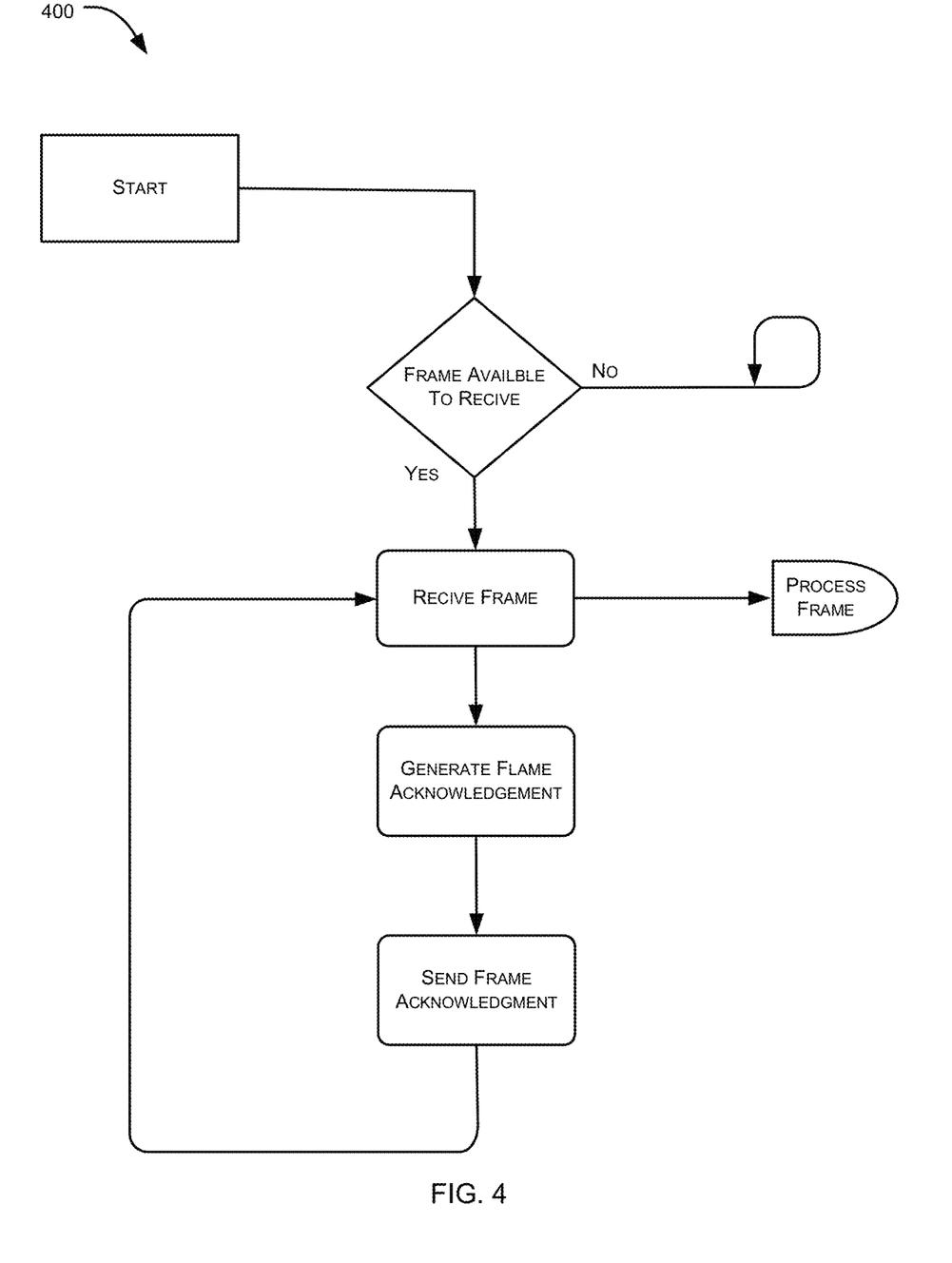
FIG. 4 illustrates exemplary flow diagram at receiver side of the proposed system, in accordance with an exemplary embodiment of the present disclosure.

FIG. 4 illustrates exemplary flow diagram at receiver side of the proposed system, in accordance with an exemplary embodiment of the present disclosure.

Figure 5:
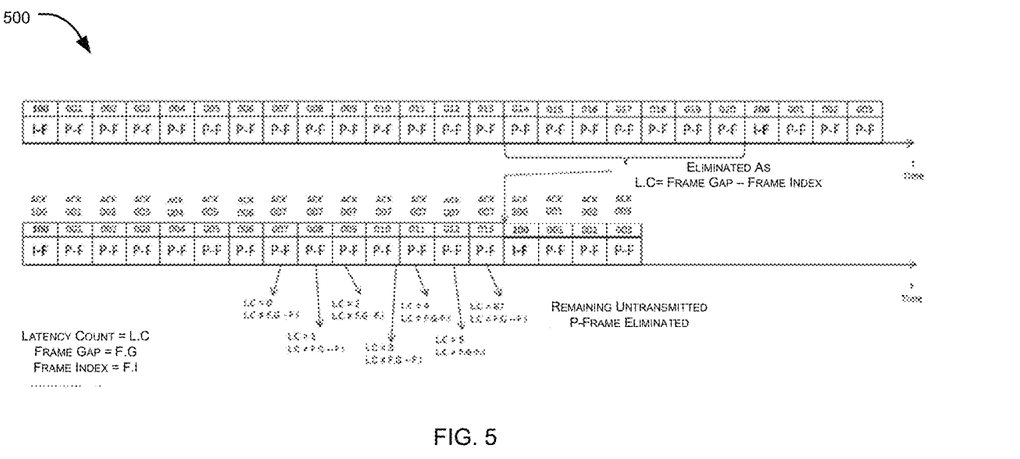
FIG. 5 illustrates an exemplary representation of video data units' transmission, in accordance with an exemplary embodiment of the present disclosure.

FIG. 5 illustrates an exemplary representation of video data units' transmission, in accordance with an exemplary embodiment of the present disclosure.

Referring to FIG. 5, video data units are shown, wherein video data units 100 and 200 are key-frames (I-frame), and all other video data units, which are in between the key-frames are intermediate frames (P-frames). Initially, in the transmission unit, the index assigning unit assigns a unique index number to every video data unit (whether I-frame or P-frame) present in the storage unit to be transmitted. The fixed number of frames generated in between two consecutive key frames is called as the frame gap i.e., the frame gap between 100 and 200 key-frames is 20. The set of P-frames succeeding an I-frame corresponds to that I-frame, for example the P-frames 001-020 following I-frame 100 corresponds the same I-frame.

The transmission unit transmits an I-frame (key-frame) along with its corresponding P-frames one by one sequentially, which are kept in a queue at the transmitter side, and the latency calculation unit keeps computing the latency count by computing the difference between the transmitted frame and the received frames. Since, each transmitted frame has an index number, once received at the receiver; the receiver sends an acknowledgement of the received frame with its index number to the transmitter. On the acknowledgement frame's arrival, the latency calculation unit computes the latency count.

After computing the latency in the transmitter, a condition is checked. If the computed latency count (index difference) is not equal to Frame Gap–Frame Index (the index number of the current un-transmitted frame), the frame kept in the Queue is de-queued and sent to the receiver. If the computed latency count (index difference) is greater than or equal to Frame Gap–Frame Index (the index number of the current un-transmitted p-frame), then the remaining number of un-transmitted P-frames equaling or greater to the latency count prior to the immediate next I-frame is eliminated from the frames kept in the queue (Decrease Frame index), and transmission is resumed from the immediate next I-frame.

In another embodiment, if the computed latency count (index difference) is greater than or equal to Frame Gap–Frame Index (The index number of the current un-transmitted p-frame), then the remaining number of un-transmitted P-frames equaling or greater to the latency count prior to the immediate next I-frame is kept being stored in the queue without sending it to the receiver as soon as each immediate P-frame is received before the immediate next I-frame. During this receiving of the P-frames, the latency computation unit keeps computing the latency count and if it finds that the latency count has reduced than the previous latency count, and then it retrieves the P-frames next in-line to the last transmitted frame sequentially that is stored in the queue and transmits it. The number of P-frames to be retrieved and sent depends on the reduction in the latency frame count.

Suppose the latency counts reduces by 1, then the transmission unit retrieves only the first next in-line stored P-frame from the queue and transmits it to the receiver. If the latency count is reduced by two, then the transmission unit retrieves two stored P-frames one by one next-line to the last transmitted frame and transmits it.

If until the receiving of the immediate next I-frame, there is no change in the latency count then the remaining number of un-transmitted P-frames equaling or greater to the latency count prior to the immediate next I-frame is eliminated from the frames kept in the queue (Decrease Frame index), and transmission is resumed from the immediate next I-frame.

Figure 6:
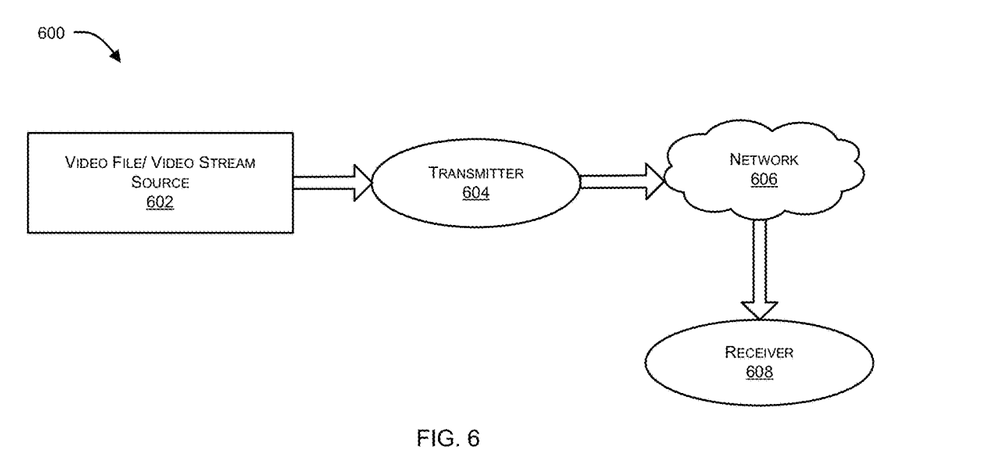
FIG. 6 illustrates an exemplary block diagram representation of the proposed system, as implemented using a UAV, in accordance with an exemplary embodiment of the present disclosure.

FIG. 6 illustrates an exemplary block diagram representation of the proposed system, as implemented using a UAV, in accordance with an exemplary embodiment of the present disclosure. In an embodiment, the system 600 can be implemented using a UAV, which can act as a source of the video transmission 602, which can be through any video capturing device placed on the UAV. The UAV can be operatively coupled with a transmitter 604, which, in turn, is operatively coupled with a receiver 608 through a wireless network 606. The system is further elaborated in the following sections, in FIG. 7.

Figure 7:
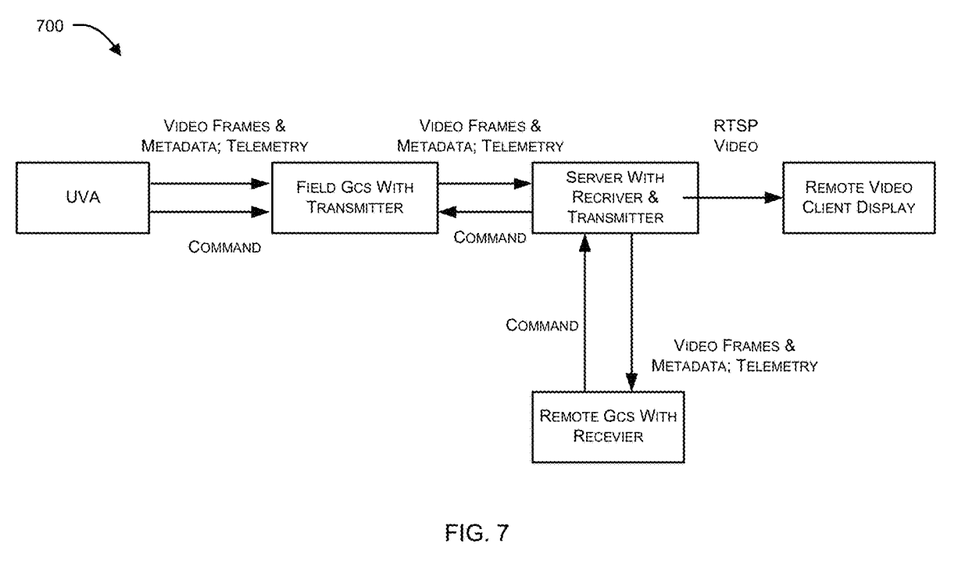
FIG. 7 illustrates an exemplary diagram of UAV based video transmission hardware, in accordance with an exemplary embodiment of the present disclosure.

FIG. 7 illustrates an exemplary diagram of UAV based video transmission hardware, in accordance with an exemplary embodiment of the present disclosure.

In an exemplary embodiment, in a transmission control protocol (TCP) network, which is a state-full network where the transmitted frame never gets lost, the transmission unit on the available frames transmits one by one the first 11 frame, I-frame 100 followed by the corresponding P-frames 001-010 one by one sequentially, which is kept in a queue, condition checked and then further sent to the receiver. The receiver on receiving the I-frame 100 sends an acknowledgement frame to the transmitter with the index number 100, 001, 002 . . . , and so on of the received frame.

Similarly, after transmitting P-frames until 010, suppose the transmitter receives the acknowledgement for P-frames only until 007. Then the latency-computing unit at the transmitter computes the latency count as Transmitted Frame–Acknowledged Frames, which is 11 Frames–8 Frames (calculated as 3). Then it checks whether the latency count 3 equals the remaining un-transmitted P-frames prior to the immediate next I-frame.

The remaining un-transmitted P-frames prior to the immediate next I-frame is checked by the following condition: Frame Gap–Frame Index, where Frame Gap is the fixed number of frames generated between 2 consecutive key-frames, and where Frame Index is the index number of the current un-transmitted p-frame at the transmitter. Frame Gap (20)–Current un-transmitted p-frame's index number (11) =9. Since, the count does not match; the transmitter sends the next frame 011 and waits for the acknowledgement. Even now, if the transmitter does not receive the acknowledgement in a pre-defined threshold time, it will compute the latency with the previous acknowledgement received and measure it as Transmitted Frame–Acknowledged Frame i.e. (12 Frames–8 Frames)=4.

As previously done, it again matches the latency count with the remaining un-transmitted P-frames prior to the immediate next I-frame, which is Frame Gap (20)–Frame index (12), which is 8 now, and since it does not match, it transmits the next P-frame 012 in line. Again, if the transmitter does not receive any acknowledgement, it calculates the latency count again which is now, Transmitted Frame–Received Frame=13 Frames–8 Frames=5. Then, it again matches this latency count 5 with the remaining un-transmitted P-frames which is Frame Gap (20)–Frame index (13) which is now 7.

Since the count does not match, the transmitter sends the next frame 013 and waits for the acknowledgement. Even now, if the transmitter does not receive the acknowledgement in a pre-defined threshold time, it will compute the latency with the previous acknowledgement received and measure it as Transmitted Frame–Acknowledged Frame=14 Frames–8 Frames=6. Then, it again matches this latency count 6 with the frame gap (20)-frame index (14) which is 6.

On matching the latency count with the Frame Gap-Frame Index, the counts match and so the elimination unit stores the P-frame 014 in the queue without sending it to the receiver (Decreases the frame index). Then, for the available p-frame 015, it again matches the latency count and if this count has not yet reduced and is now six, then the elimination unit will again store this p-frame 015 in the queue and move on to the next p-frame. The same is latency calculation is done for the p-frames 016,017,018,019, 020 and if the latency count does not decrease, then each of the p-frame is kept in the queue by the elimination unit and is not sent to the receiver. On the availability of the immediate next I-frame, all the prior p-frames kept at the queue are eliminated and transmission is resumed from the immediate next I-frame with existing latency and carried forward.

Thus, it will be appreciated by those of ordinary skill in the art that the diagrams, schematics, illustrations, and the like represent conceptual views or processes illustrating systems and methods embodying this invention. The functions of the various elements shown in the figures can be provided through the use of dedicated hardware as well as hardware capable of executing associated software. Similarly, any switches shown in the figures are conceptual only. Their function can be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claim.

In the foregoing description, numerous details are set forth. It will be apparent, however, to one of ordinary skill in the art having the benefit of this disclosure, that the present invention can be practiced without these specific details. In some instances, well-known structures and devices are shown in block diagram form, rather than in detail, to avoid obscuring the present invention.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps can be present, or utilized, or combined with other elements, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention can be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

Advantages of the Invention

The present invention provides a system for live streaming video data with reduced latency and interference.

The present invention provides a reliable, optimized and efficient system and method for live streaming of high definition video data with reduced latency on irregular networks.

The present invention provides a method for live streaming video data with reduced latency and interference.

The present invention provides a reliable, optimized and efficient system and method for live streaming video data, with reduced latency, on low-bandwidth networks.

The present invention provides a robust system and method for live streaming video data with reduced latency and with enhanced quality.

The present invention provides a system and method for live streaming video data by utilizing less memory and without garbling the video data.

The present invention provides a system and method for live streaming video data with less transmission retries and higher throughput.

The present invention provides a system and method for providing high resolution live streaming video data with reduced latency.

What is claimed is:

1. A system for providing live streaming of video data, the system comprising:
    a storage unit configured to store a plurality of waiting to transmit set of multimedia data signals from one intra-coded frame (I-frame) to next I-frame;
    an index assignment unit operatively coupled to the storage unit and adapted to assign an index number to each multimedia data signal to be transmitted;
    a latency calculating unit operatively coupled to the index assignment unit and configured to calculate latency count in transmission upon transmission of the set of multimedia data signals such that a predefined condition is checked, by a conditioning unit;
    a transmitting unit operatively coupled to the conditioning unit and adapted to transmit the set of multimedia data signals comprising I-frames and inter-coded frames (P-frames) based on the calculated latency count; and
    an elimination unit operatively coupled to the transmitting unit, the elimination unit is configured to, when the calculated latency count is equal to the predefined condition, eliminate at least a same number as the calculated latency count of un-transmitted P-frames prior to an immediate next I-frame waiting to be transmitted in the storage unit.

2. The system as claimed in claim 1, wherein the system comprises a receiving unit configured to decode a received I-frame from the transmitting unit.

3. The system as claimed in claim 1, wherein the system comprises a control unit operatively coupled to the elimination unit, the control unit comprises processors and a memory coupled to the processors, the memory storing instructions executable by the processors to control the transmitting unit in transmitting the immediate next I-frame after elimination of the P-frames.

4. The system as claimed in claim 3, wherein the latency calculating unit is configured to calculate latency count by computing difference between a transmitted frame and received frames, wherein each transmitted frame comprises an index number and upon receipt of the transmitted frame by a receiver, the receiver is adapted to generate an acknowledgement frame with the corresponding index number to the transmitting unit, and wherein the latency calculation unit, upon generation of an acknowledgement frame, calculates the latency count.

5. The system as claimed in claim 4, wherein when the calculated latency count is not equal to a corresponding index number of an un-transmitted P-frame, then a corresponding frame in a queue is de-queued and sent to the receiver.

6. The system as claimed in claim 4, wherein when the calculated latency count is not less than a corresponding index number of an un-transmitted P-frame, then a remaining number of un-transmitted P-frames that are not less than the latency count, prior to an immediate next I-frame is eliminated from frames kept in the queue, and transmission is resumed from the immediate next I-frame.

7. A method for providing live streaming of video data, the method comprising steps of:
   storing, by a storage unit, a plurality of waiting to transmit set of multimedia data signals from one intra-coded frame (I-frame) to next I-frame;
   assigning, by an index assignment unit, an index number to each multimedia data signal to be transmitted;
   calculating, by a latency calculating unit, latency count in transmission upon transmission of the set of multimedia data signals such that a predefined condition is checked, by a conditioning unit;
   transmitting, by a transmitting unit, the set of multimedia data signals comprising I-frames and inter-coded frames (P-frames) based on the calculated latency count; and
      eliminating, by an elimination unit, at least a same number as the calculated latency count of un-transmitted P-frames prior to an immediate next I-frame waiting to be transmitted in the storage unit, when the calculated latency count is equal to the predefined condition.

8. The method as claimed in claim 7, wherein the method comprises a step of controlling, by a control unit, the transmitting unit in transmitting the immediate next I-frame after elimination of the P-frames.

9. The method as claimed in claim 8, wherein at the step of calculating latency, the latency calculating unit is configured to calculate latency count by computing difference between a transmitted frame and received frames, wherein each transmitted frame comprises an index number and upon receipt of the transmitted frame by a receiver, the receiver is adapted to generate an acknowledgement frame with the corresponding index number to the transmitting unit, wherein the latency calculation unit, upon generation of an acknowledgement frame, calculates the latency count.

10. The method as claimed in claim 9, wherein when the calculated latency count is not equal to a corresponding index number of an un-transmitted P-frame, then a corresponding frame in a queue is de-queued and sent to the receiver.

11. The method as claimed in claim 9, wherein when the calculated latency count is not less than a corresponding index number of an un-transmitted P-frame, then a remaining number of un-transmitted P-frames that are not less than the latency count, prior to an immediate next I-frame is eliminated from frames kept in the queue, and transmission is resumed from the immediate next I-frame.

12. A UAV-based system for providing live streaming of video data, the system comprising:
   a storage unit provided on the UAV, configured to store a plurality of waiting to transmit set of multimedia data signals from one intra-coded frame (I-frame) to next I-frame;
   an index assignment unit operatively coupled to the storage unit and adapted to assign an index number to each multimedia data signal to be transmitted;
   a latency calculating unit operatively coupled to the index assignment unit and configured to calculate latency count in transmission upon transmission of the set of multimedia data signals such that a predefined condition is checked, by a conditioning unit;
   a transmitting unit provided on the UAV, operatively coupled to the conditioning unit and adapted to transmit the set of multimedia data signals comprising I-frames and inter-coded frames (P-frames) based on the calculated latency count; and
   an elimination unit operatively coupled to the transmitting unit, the elimination unit is configured to, when the calculated latency count is equal to the predefined condition, eliminate at least a same number as the calculated latency count of un-transmitted P-frames prior to an immediate next I-frame waiting to be transmitted in the storage unit.

\* \* \* \* \*